Figure 1:
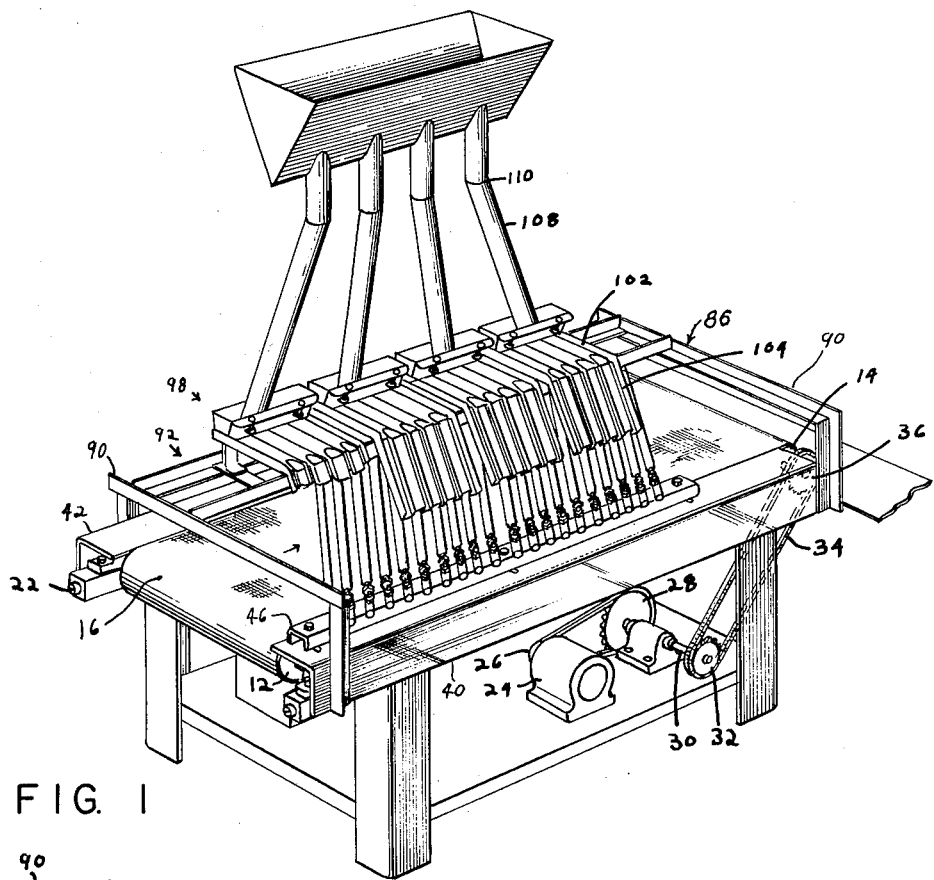

INVENTOR.
JAMES W. GARDNER
BY Morse & Altman
ATTORNEY

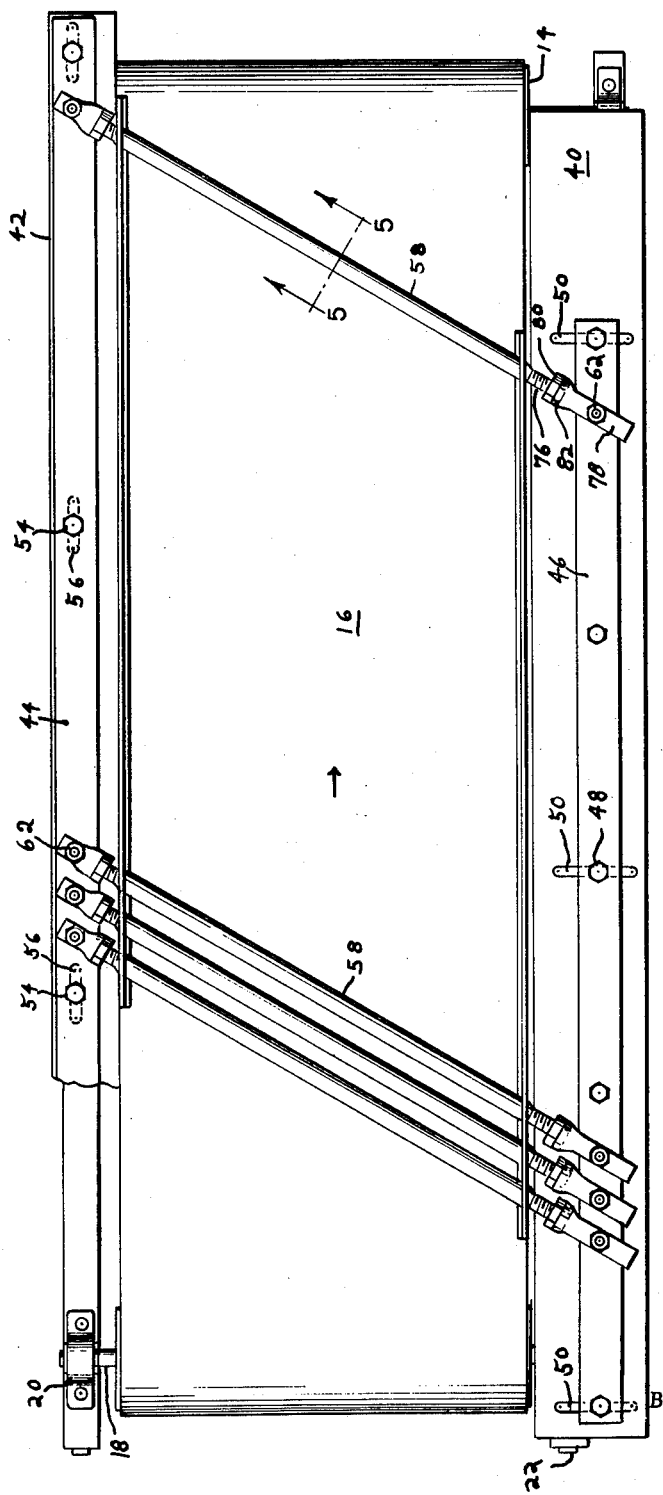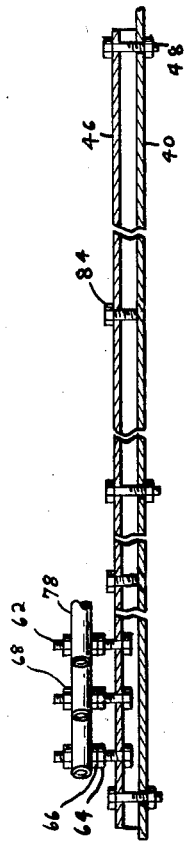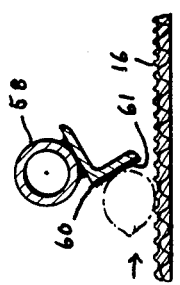

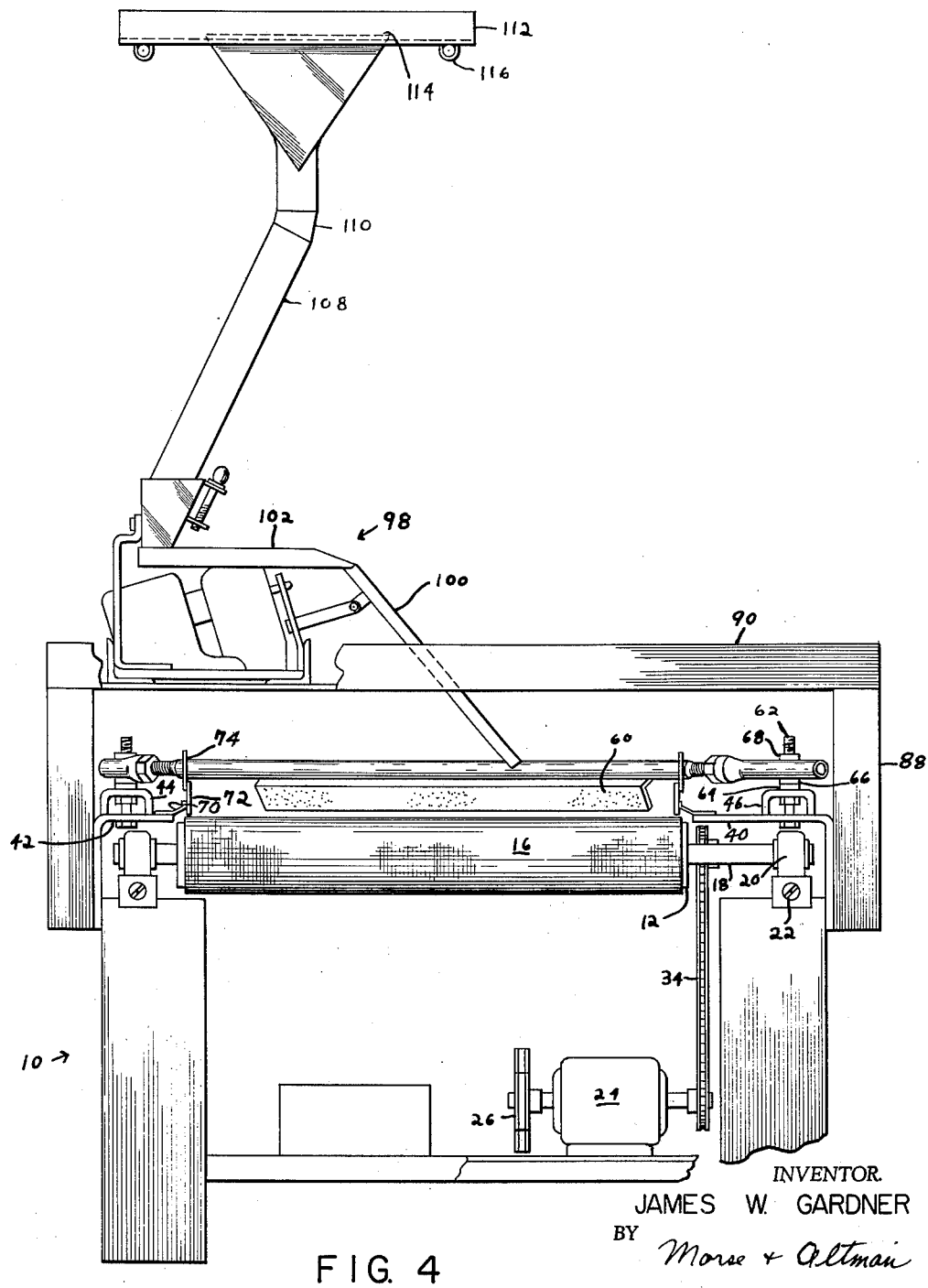

3,196,914
APPARATUS FOR BLANCHING NUTS
James W. Gardner, Tyrone, Pa., assignor to Seabrook Blanching Corporation, Edenton, N.C., a corporation of North Carolina
Filed Aug. 6, 1962, Ser. No. 215,005
3 Claims. (Cl. 146—32)

This invention relates generally to nut blanching and more particularly concerns a novel process and apparatus for quickly and efficiently removing skins from shelled peanuts and the like without splitting, crushing or otherwise damaging the nut without disturbing the natural oils in the nut.

According to present practice and as disclosed in U.S. Patent 2,558,899 shelled peanuts and the like may be blanched by slitting their skins, dousing them in scalding water and then gently rubbing the skins off by massaging the nuts between opposing rubbing surfaces that are oscillating relative to one another. Alternative to passing the nuts between rubbing elements, U.S. Patent 2,702,574 discloses a method and apparatus for blanching nuts involving a series of vanes or baffles disposed in reversely inclined directions across a conveyor in position to roll the nuts in zig zag fashion across the conveyor and so remove their skins. Both of these techniques, while effective in blanching nuts, involve excessive rubbing of the nuts and consume a relatively substantial amount of time. Furthermore, the high temperature of the water in the scalding step adversely affects the oil structure of the nut reducing its shelf life.

Accordingly, it is a general object of the present invention to provide an improved method and apparatus for removing skins from shelled nuts.

Another object of this invention is to provide a novel method for blanching nuts without impairing their quality to any extent.

Still another object of this invention is to provide a nut blanching apparatus that may be readily adjusted to accommodate shelled nuts of various grades, sizes and skin thicknesses.

Yet another object of this invention is to provide a nut blanching apparatus that is adjustable to blanch various types of shelled nuts at optimum speed and with a small percentage of split or crushed nuts.

More particularly, this invention features a nut blanching process wherein nuts which have had their outer shells removed and their inner skins slit from end to end are subjected to a controlled drying step in which dehumidified air is circulated through the nuts and the temperature of the nuts during this step is not permitted to exceed a predetermined level above which the oil structure of the nut would be altered. From this temperature level the nuts are slowly cooled to room temperature and, as a result, the skins start to peel along the slits and away from the nut. These skins are then completely removed by trapping and rolling the nut between a supporting moving surface and a fixed abutment inclined angularly with respect to the path of travel of the moving surface. A novel mechanism for performing this step is a feature of this invention and includes a horizontally moving surface over which a series of parallel spaced abutments are mounted, each abutment is adapted to trap and roll a flow of nuts deposited on the moving surface in front of each abutment. According to the invention the abutments are arranged for angular adjustment through a horizontal plane over the moving surface, as well as being angularly adjustable about their longitudinal axes. Height adjustment means are also provided for the abutments. This invention also features a novel dispensing arrangement whereby the nuts may be fed onto the belt at any selected position so as to increase or decrease, as desired, the effective duration of rolling contact with the abutments.

Figure 2:
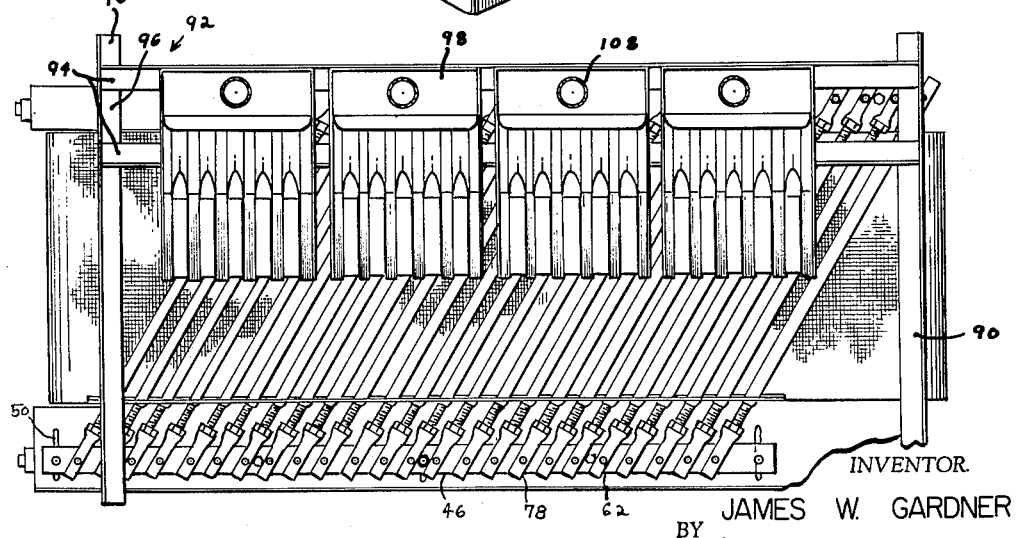

But these and other features of the invention, along with further objects and advantages thereof will become more fully apparent from the following detailed description of the invention with reference being made to the accompanying drawings in which;

FIG. 1 is a view in perspective of a nut blanching apparatus made according to the invention, FIG. 2 is a top plan view of the apparatus shown in FIG. 1, FIG. 3 is a view similar to FIG. 2 but with the dispensing units and supporting structure removed to show details of construction, FIG. 4 is a view in end elevation of the apparatus, FIG. 5 is a cross-sectional view taken along the lines 5—5 of FIG. 3, FIG. 6 is a detail view showing a modification of the abutment supporting structure.

In the practice of my invention, peanuts and the like which have had their outer shells removed are passed through a skin slitting apparatus such as that shown in my U.S. Patent No. 2,699,806. In the above patent, the nuts are carried between a pair of spaced and opposing knife edges which slit opposite sides of each nut from end to end. According to the present invention, once the slits have been made in the nuts they are transferred to a drying or dehydrating chamber wherein a continuous flow of dehumidified air is circulated over and around the nuts so as to dry their skins. This drying process causes the skins to start peeling away from the nut along the slits. Once the skins have started to peel, the nuts are fed onto a blanching apparatus which will be described in detail below.

In carrying out the process of my invention, the large volume of fresh dehumidified air which passes continuously around and over the nuts may have its moisture content removed by any conventional techniques such as by the use of an activated oxide of aluminum, $Al_2O_3$, commonly known as alumina, for example. A conventional air heating system may be employed to heat the air to the desired temperature. This air is then introduced to the drying chamber wherein the nuts are carried back and forth and downwardly by means of a bank of conveyors stacked in staggered arrangement one above the other with each conveyor depositing its charge of nuts to the conveyor immediately below it. As the nuts descend through the drying chamber, the temperature gradually lowers until the nuts are discharged at approximately room temperature.

In carrying out this process, it is important to control the temperature of the dehumidified air so that it does not exceed a maximum level above which the oil structure of the nuts would be adversely affected. It has been found, that when processing peanuts, for example, a temperature of approximately 160° F. is the maximum allowable temperature and that very satisfactory results are obtained with a drying period of approximately 38 minutes although this may be varied from 30 to 60 minutes according to the particular nuts being processed. In any event, the skins of the nuts are first slit, the nuts are then passed through the dehydrating process wherein the skins start to curl along the slits. This curling of the skins facilitates subsequent removal of the entire skin by passing the nuts through the blanching apparatus to be described below.

By maintaining the temperature of the nuts below a predetermined level which for peanuts has been found to be 160°. for example, the shelf life of the nuts is substantially extended over nuts blanched by processes involving high temperatures which roast the nuts to a certain extent and drive out or so alter the natural oils in the nuts that the quality of the nut is impaired. Nuts which have been heated to temperatures which change the oil structure of the nut are more brittle than the nuts blanched by the above process. Furthermore, such nuts are more readily susceptible to becoming rancid if stored for any extended period.

Referring now to the drawings, the nut blanching apparatus of my invention is generally organized about an upright table 10 which has mounted at the top thereof and at either end rollers 12 and 14 about which is looped an endless conveyor belt 16. The belt 16 may have a width of 36 inches, for example, with a substantially flat horizontal upper surface six feet or so in length. The belt surface employed in the illustrated embodiment is of a frictional character being fabricated from reinforced rubber or other suitable material and preferably being formed with a number of very small closely spaced truncated pyramids to provide good gripping surface for moving nuts along the belt in the direction indicated by the arrow of FIG. 3. The rollers are approximately six inches in diameter and perhaps 37 inches or so in length with their arbors 18 supported at their ends in bearing blocks 20. Preferably the blocks are adjustable lengthwise of the table 10 by means of screws 22 whereby the belt may be properly tensioned and the two rollers aligned in true parallel relation.

The upper reach of the belt 16 is fully supported throughout its length and width by an underlying panel (not shown) which provides a firm, smooth and flat supporting surface for the belt as it travels between the rollers. The belt is moved by means of a variable speed motor 24 mounted below the belt and driving the roller 14 by means of connected pulleys 26 and 28 which drive a shaft 30 carrying a gear 32 in mesh with a chain 34. The chain in turn is looped about a sprocket gear 36 mounted on the end of the shaft supporting the roller 14.

Mounted to the table 10 and extending lengthwise thereof on opposite sides of the belt 16 are a pair of horizontal supports 40 and 42. Each of these supports carries an inverted channel member 44 and 46 with the member 46 being mounted for lateral adjustment by means of bolts 48 passing through lateral slots 50 formed in the support 40. The channel member 44 on the other hand is mounted for longitudinal adjustment on the member 42 by means of bolts 54 passing through longitudinal slots 56. Extending diagonally across the belt 16 are a plurality of parallel abutments in the form of elongated tubings 58 with depending baffle members 60 attached lengthwise thereto. Typically, the leading surface of each baffle member is of an abrasive character which may be provided by a ply of grit paper 61 applied thereto or a strip of roughened metal of a type adapted to remove the skin from a peanut or the like which is trapped and rolled lengthwise along the baffle.

The opposite ends of the tubings 58 are mounted on the channel members 44 and 46 by means of vertical pins 62 spaced evenly along the top surface of each member. Each of the pins is threaded and provided with two lower nuts 64 and 66 with a third nut 68 attached to the upper end of the pin 62 for clamping the end of the tubing in place. It will be understood that by properly rotating the nuts 64, 66 and 68 the effective height of the tubings 58 may be adjusted relative to the top surface of the belt 16. It will also be appreciated that the angular position of the tubings across the belt 16 may be varied by loosening the bolts 48 and 54 and manually shifting the member 46 laterally and the member 52 longitudinally until the desired angle of the tubings 58 is achieved. By mounting the tubings on the pins 62, all of the abutments, which may be 24 in number extending parallel to one another, may be adjusted simultaneously. Once the proper setting is reached, the bolts 48 and 54 are again tightened to clamp the channel members 44 and 46 firmly against their supports.

It will be noted in FIG. 3 that the baffles 60 along one side do not extend for the entire width of the belt 60, but rather terminate two more inches from the left hand edge of the belt as viewed in FIG. 3. The right hand end of the baffle 60 extends substantially to the edge of the belt so that nuts fed onto the belt between each of the abutments will be moved forwardly and to the left until they reach the discharge portion of the belt which extends along the left hand side of the belt. In practice, a guard 70 extends along opposite sides of the belt and may be in the form of a rubber strip 72 attached to elongated metal strips 74 which rest on top of the abutments. The rubber strips depend from their supporting elements to the surface of the belt 16 thereby preventing any stray nuts from rolling off the conveyor system.

As best shown in FIG. 3, the abutments are mounted for rotary adjustment about their longitudinal axes whereby their abrasive, nut-engaging surfaces may be arranged to define a selected acute angle with respect to the belt 16. It will be understood that nuts travelling along with the moving belt will be trapped within the acute angle defined by the baffles 60 and the belt 16 and will be rolled along lengthwise of the baffle and diagonally of the belt towards the left hand discharge part of the belt as shown in FIG. 3. Depending upon the size and the character of the nuts that are being blanched, the baffles may be adjusted to whatever angle produces the best blanching action. As illustrated in FIG. 3 each end of each abutment tubing 58 is threaded at 76 and received in the tapped end of a sleeve 78 which is pivotally mounted about a vertical axis to the pin 62. The threaded end of the tubing 58 is also provided with a jam nut 80 which, when backed off, will permit the tubing to be rotated 360° about its longitudinal axis. When the selected angular position is reached, the jam nut 80 is tightened up against a nut head 82 formed on the inner end of the sleeve 78, thereby locking the tubing in position. It will be appreciated that while both ends of the abutments may be tightened in the desired angular position for maximum rigidity sufficient positioning may be obtained by merely locking one end of each abutment. By providing a full 360° adjustment, the frictional surface of the baffle 60 may be raised into a horizontal position to permit periodic cleaning of that surface.

In FIG. 6 there is illustrated a modification of the supporting structure for the abutments and, in this embodiment the channel members 44 and 46 are provided with vertical adjustment screws 84 which are threaded to the channel members with their lower ends bearing against the upper surfaces of the horizontal supports 40 and 42. This arrangement permits all of the abutments to be raised or lowered simultaneously by merely rotating the screws 84 one way or the other as desired.

Referring again to the principal embodiment and more particularly to FIGS. 1, 2 and 4, there is illustrated a novel feeding arrangement for dispensing separate streams of nuts at selected locations on the belt 16. As shown, an overhead bridge 86 is mounted to the table 10 by means of a pair of vertical brackets 88 located at each end of the table 10. Each pair of brackets 88 supports a channel member 90 which extends transversely across the belt 16 in general parallelism with the rollers 12 and 14. Mounted between the channels 90 for transverse sliding movement above the belt 16 is a frame 92 comprising a pair of spaced channel members 94 rigidly fixed in spaced parallel relation to one another by a cross piece 96 welded thereto. Slidably mounted between the channel members 94 is a battery of vibratory dispensing units 98 which are adaped to feed nuts down an inclined ramp 100. Each vibratory feeder, it will be noticed, is formed with a plurality of spaced parallel troughs 102 which are aligned with troughs 104 formed in the ramps 100. These troughs are evenly spaced to correspond with the spacing between the abutments, so that when the lower ends of the ramps 100 are positioned over the abutments in the manner illustrated, the nuts coming down the ramps will be deposited on the belt between adjacent abutments. It will be appreciated that with the above mounting arrangement the vibratory feeders, as well as their discharge ramps, may be adjusted longitudinally and laterally relative to the surface of the conveyor 16, to accommodate changes in the diagonal orientation of the abutments. Also, the nuts may be deposited at any selected postion along the lengths of the abutments to vary, as desired, the duration and amount of rubbing contact with the abutments. As shown in the drawings, the feeders are arranged to discharge the nuts approximately at the mid-position of the belt with the feeders being positioned at the far left hand side of the bridge 86. By moving the bracket 92 to the right along the channels 90, the feeders will also be moved to the right so that the nuts will be deposited further along the abutments. This will increase the path which must be travelled by the nuts before reaching the left hand discharge path. In order to reduce the path of travel of the nuts, the feeders may be shifted to the right hand side of the channels 90 and their positions reversed so that the ramps 100 will be inclined downwardly to the left rather than as illustrated. In this fashion the nuts may be deposited closer to the left hand discharge side of the belt. It is thus possible to provide for any selected diagonal positioning of the deposit points of the ramps 100 as well as to accommodate for shifting of the abutments relative to the belt 16.

Each of the vibratory feeders 98 are fed from an overhead hopper 106 through conduits 108 provided with adjustable elbows 110. The hopper is supported for lateral and longitudinal adjustment by means of a pair of supporting tracks 112 which engage lips 114. The tracks 112 are rigidly connected by means of a pair of slotted cross members 116, which in turn, are connected to an overhead supporting piece by means of bolts so that the tracks 112 may be moved laterally by means of loosening these bolts. The hopper 106, of course, may be moved longitudinally of the tracks 112 to accommodate the positioning of the vibratory feeders 98 throughout their full range of adjustment.

It will be appreciated that the process and apparatus described herein are particularly efficient and useful in that the nuts which are blanched according to the invention will not be damaged and will emerge in a fresh whole condition. In the trade, blanched nuts that have few, if any, splits and which have a potentially long shelf life command a much higher price than those nuts which obtain a high percentage of splits and which cannot be stored for any extended period. It will also be appreciated that the apparatus described herein will accommodate various sizes and grades of nuts as well as different kinds of nuts. By providing a full range of adjustment for the various components in the blanching apparatus, optimum performance is obtainable for any blanching situation. The adjustment features of this invention provides maximum control over the blanching process to eliminate as far as possible splitting and crushing of the nuts as they pass along the abutments.

While the invention has been described with particular reference to the illustrated embodiments, it will be understood that numerous modifications thereto will appear to those skilled in the art. It will also be understood that the invention illustrated and described herein has been made by way of illustration and should not be taken in a limiting sense.

Having thus described my invention, what I claim and desire to obtain by Letters Patent of the United States is:

1. Apparatus for blanching peanuts and the like comprising an endless belt conveyor having a substantially flat horizontal upper surface, means for driving the conveyor in a direction moving its upper surface forwardly, a plurality of relatively long and substantially straight abutments all disposed in parallel spaced relation adjacent to and inclined transversely across and above the upper surface of the conveyor with one end of each abutment terminating within the path of the conveyor and forwardly of the other end, said conveyor in cooperation with said abutments being adapted to remove the skins from said nuts by carrying nuts forwardly to engage and roll along the abutments and around said one end thereof, said abutments being mounted for simultaneously angular adjustment about an axis normal to the plane of the upper surface of the conveyor for increasing or decreasing the angle at which said nuts are moved along said abutment toward one end and means for dispensing a separate stream of peanuts rearwardly of each of said abutments.

2. Apparatus according to claim 1 wherein said nut dispensing means is mounted above said conveyor and is adapted to deposit a stream of nuts onto said conveyor between each of said abutments, said dispensing means being movable in a horizontal plane laterally and longitudinally relative to said conveyor for changing the points where said nuts are deposited on said conveyor.

3. Apparatus according to claim 1 including height adjustment means supporting all of said abutments for raising and lowering all of said abutments simultaneously with respect to said conveyor to vary the gap between the lower edges of said abutments and the surface of said conveyor.

References Cited by the Examiner
UNITED STATES PATENTS

| | | | |
|---|---|---|---|
| 1,190,555 | 7/16 | Kelly | 146—32 |
| 2,405,292 | 8/46 | Curlee | 146—32 |
| 2,558,899 | 7/51 | Green | 146—230 |
| 2,702,574 | 2/55 | Green | 146—32 X |
| 2,995,166 | 8/61 | Burley et al. | 146—227 |
| 3,077,217 | 2/63 | Hind | 146—221.7 |

J. SPENCER OVERHOLSER, *Primary Examiner.*

CARL W. ROBINSON, *Examiner.*